(12) United States Patent
Douglas et al.

(10) Patent No.: US 12,026,488 B2
(45) Date of Patent: Jul. 2, 2024

(54) BYTECODE TRANSFORMATIONS USING VIRTUAL ARTIFACTS

(71) Applicant: Red Hat, Inc., Raleigh, NC (US)

(72) Inventors: Stuart Wade Douglas, Orange (AU); James Roger Perkins, Government Camp, OR (US)

(73) Assignee: Red Hat, Inc., Raleigh, NC (US)

( * ) Notice: Subject to any disclaimer, the term of this patent is extended or adjusted under 35 U.S.C. 154(b) by 752 days.

(21) Appl. No.: 16/912,445

(22) Filed: Jun. 25, 2020

(65) Prior Publication Data

US 2021/0405982 A1 Dec. 30, 2021

(51) Int. Cl.
*G06F 8/52* (2018.01)
*G06F 8/41* (2018.01)
*G06F 9/455* (2018.01)

(52) U.S. Cl.
CPC .............. *G06F 8/52* (2013.01); *G06F 8/433* (2013.01); *G06F 9/45508* (2013.01)

(58) Field of Classification Search
CPC ......... G06F 8/52; G06F 8/433; G06F 9/45508
See application file for complete search history.

(56) References Cited

U.S. PATENT DOCUMENTS

| | | | | |
|---|---|---|---|---|
| 6,321,377 B1* | 11/2001 | Beadle | ................ | G06F 9/45516 717/148 |
| 7,426,723 B1* | 9/2008 | Nikolov | ................... | G06F 8/52 717/151 |
| 9,389,851 B1 | 7/2016 | Nelson et al. | | |
| 9,678,729 B2* | 6/2017 | Goetz | ....................... | G06F 8/71 |
| 9,823,909 B1* | 11/2017 | Kuo | ........................... | G06F 8/52 |
| 10,075,439 B1* | 9/2018 | Mullens | ................ | H04L 63/126 |
| 10,114,637 B1 | 10/2018 | Willson et al. | | |
| 2004/0205738 A1* | 10/2004 | Yoshida | .................. | G06F 8/433 717/150 |
| 2008/0301653 A1 | 12/2008 | Song et al. | | |
| 2009/0204963 A1* | 8/2009 | Swart | .................... | G06F 9/5022 718/1 |
| 2014/0053143 A1* | 2/2014 | Conrod | ................ | G06F 9/4552 717/148 |
| 2015/0378757 A1* | 12/2015 | Crowther | .............. | G06F 8/4441 717/148 |

(Continued)

OTHER PUBLICATIONS

Arjan Tijms, "Transition from Java EE to Jakarta EE", published by Java Magazine, Feb. 27, 2020, pp. 1-9 (Year: 2020).*

(Continued)

*Primary Examiner* — S. Sough
*Assistant Examiner* — Zheng Wei
(74) *Attorney, Agent, or Firm* — Kilpatrick Townsend & Stockton, LLP

(57) ABSTRACT

Methods and systems for transforming bytecodes using virtual artifacts are disclosed. In one aspect, a method is provided that includes receiving a build request to convert source code into a first bytecode. A first virtual artifact may be identified within the source code and it may be determined that a local repository does not store the first virtual artifact. A real artifact that corresponds to the first virtual artifact may be retrieved from a centralized repository. A bytecode transformation may be applied to the real artifact to generate a second bytecode and the second bytecode may be added to the first bytecode.

19 Claims, 7 Drawing Sheets

(56) References Cited

U.S. PATENT DOCUMENTS

2017/0308386 A1\* 10/2017 Devitt-Carolan ..... G06F 9/4416
2019/0004774 A1    1/2019 Mount

OTHER PUBLICATIONS

Dann et al., "SootDiff Bytecode Comparison across Different Java Compilers", published by ACM, SOAP '19, Jun. 22, 2019, Phoenix, AZ, USA, pp. 14-19 (Year: 2019).\*
Transforming dependency artifacts on resolution; Gradle (https://docs.gradle.org/current/userguide/artifact_transforms.html); retrieved Mar. 11, 2020; (18 pages).
POM Reference; (http://www.javaworld.com/javaworld/jw-05-2006/jw-0529-maven.html); retrieved Mar. 11, 2020 (41 pages).
European Search Report for App. No. 20216388.7-1224 dated Jun. 1, 2021 (13 pages).
European Examination Report for Application No. 20216388.7, dated Feb. 13, 2024, 6 pages.

\* cited by examiner

BYTECODE TRANSFORMATIONS USING VIRTUAL ARTIFACTS

BACKGROUND

When developing software, applications may require different types of files for execution. For example, an application may include one or more files containing code (e.g., source code, bytecode) that indicates the actions taken when executing the application. An application may also include other types of files, such as files containing configurations, data, images, or other information necessary to properly execute the application.

SUMMARY

The present disclosure presents new and innovative systems and methods for performing bytecode transformations. In one aspect, a method is provided that includes receiving a build request to convert source code for an application into a first bytecode for the application and identifying a first virtual artifact within the source code. The method may further include determining that a local repository does not store the first virtual artifact and retrieving, from a centralized repository, a real artifact that corresponds to the first virtual artifact. The method may also include applying, to the real artifact, a bytecode transformation to generate a second bytecode and adding the second bytecode to the first bytecode.

In another aspect, a system is provided that includes a processor and a memory. The memory may store instructions which, when executed by the processor, cause the processor to receive a build request to convert source code for an application into a first bytecode for the application, identify a first virtual artifact within the source code, and generate a second bytecode based on the first virtual artifact. The instructions may also cause the processor to determine that the first virtual artifact has a dependency and identify a second virtual artifact within the dependency. The instructions may further cause the processor to generate a third bytecode based on the second virtual artifact and add the second bytecode and the third bytecode to the first bytecode.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the disclosed subject matter.

DETAILED DESCRIPTION OF EXAMPLE EMBODIMENTS

Figure 1:
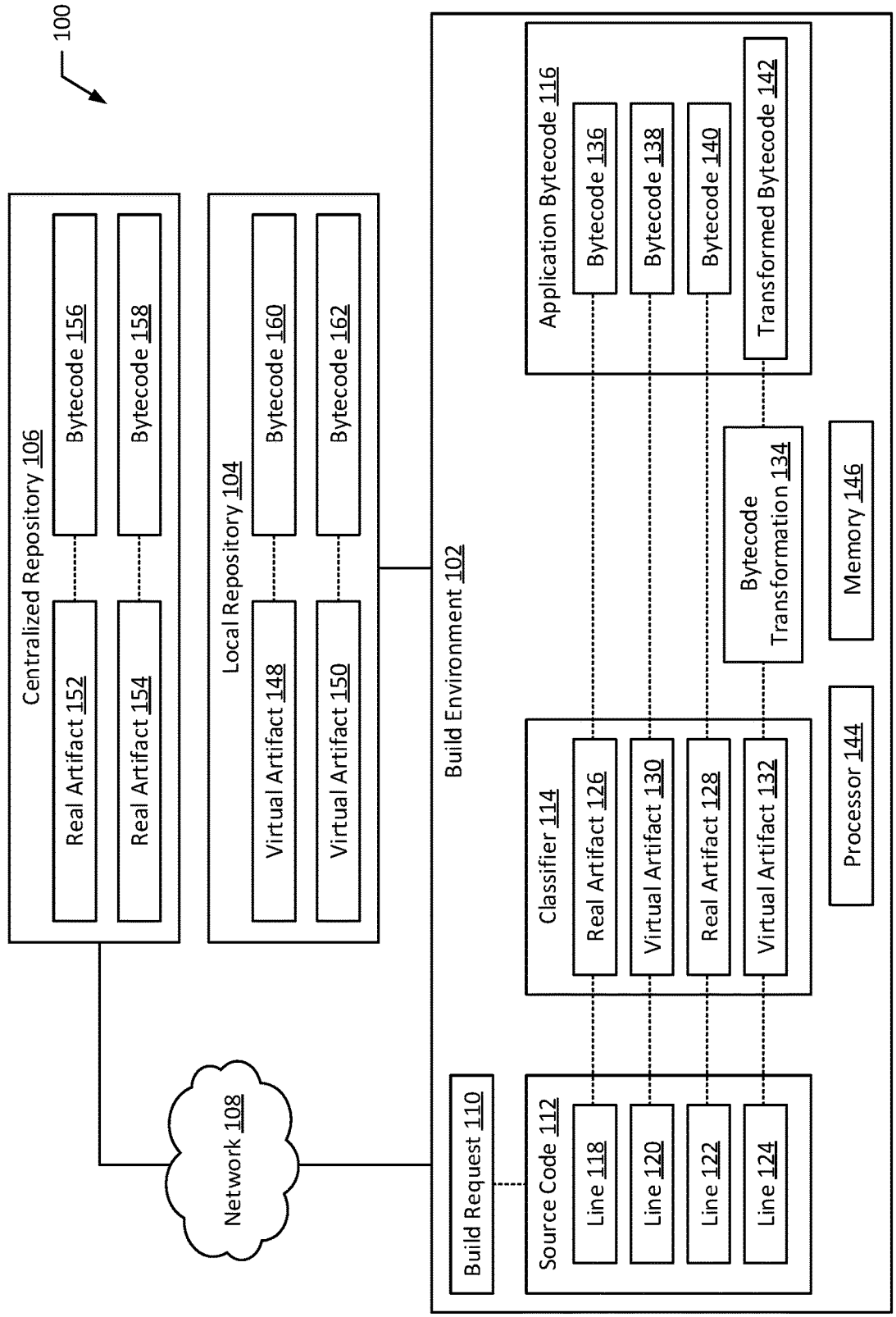
FIG. 1 illustrates a system according to an exemplary embodiment of the present disclosure.

In certain implementations, applications may need to be transformed or otherwise altered to properly execute. Transforming the archive may alter the bytecode for the application. The transformation may be performed, e.g., to configure an application for execution within a particular computing environment. For example, an application may be initially prepared and configured to execute within a particular operating system or version of an operating system (e.g., a Red Hat® Enterprise Linux® operating system). To execute properly within a different operating system, application bytecode may need to be modified. As another example, an application may be prepared to execute within a particular runtime environment (e.g., the Java® EE 8 runtime environment). However, executing in a different runtime environment (e.g., the Eclipse® Jakarta EE® 9 runtime environment) may require certain aspects of the application to be changed to comply with an execution requirement. In particular, the Eclipse® Jakarta EE® 9 may utilize similar types of classes and functions as the Java® EE 8 specification, but may utilize a different namespace and/or organizational taxonomy for classes and functions. Therefore, it may be necessary to update bytecode and/or class definition files for an application initially configured within the Java® EE 8 runtime environment for proper execution within the Eclipse® Jakarta EE® 9 runtime environment.

Typically, to perform such transformations, transformation tools such as ASM, Javassist, and Byte Buddy may be used to create individualized transformations identifying types of transformations that may be performed on particular types of data. For example, a transformation may be created to transform bytecode configured for execution in one operating system into bytecode that can be executed in a different operating system. As another example, a separate transformation may be created to transform a class file configured for execution in the Java® EE 8 runtime environment into a class file that can be executed in the Eclipse® Jakarta EE® 9 runtime environment. However, such systems require that the particular transformation used for each archive be specifically identified. Furthermore, these tools may typically exist separate from development tools, such as integrated development environments or build environments, which may require separate tools to be utilized, increasing complexity and processing time, thereby reducing responsiveness.

Accordingly, there exists a system capable of detecting when bytecode transformations are needed and applying transformations as necessary. Furthermore, such a system should be capable of performing bytecode transformations as a part of generating the bytecode for an application. One solution to this problem is to provide a build environment capable of detecting artifacts within source code. The artifacts may include real artifacts corresponding to bytecode stored within a centralized repository (e.g., a repository accessible by multiple build environments). The classifier may also be configured to identify virtual artifacts, which may correspond to lines of the source code that require bytecode transformation. In certain instances, bytecode corresponding to the virtual artifacts (e.g., bytecode that has been previously transformed based on a similar or identical line(s) of source code) may be stored within a local repository of the build environment. In such instances, the build environments may retrieve the corresponding bytecode. In other instances, transformed bytecode for the virtual artifacts may need to be generated. For example, the build environment may identify a corresponding real artifact within the centralized repository and may retrieve bytecode associated with the real artifact. The build environment may then apply bytecode transformations to the retrieved bytecode to generate transformed bytecode for execution.

FIG. 1 illustrates a system 100 according to an exemplary embodiment of the present disclosure. The system 100 may be configured to build application bytecode using real artifacts and virtual artifacts. The system 100 includes a build environment 102, a local repository 104, and a centralized repository 106. The build environment 102 may be configured to receive and process build requests 110 to generate application bytecode 116 for execution (e.g., for execution by a computing system and/or within a cloud computing environment). In particular, the build environment 102 may receive a build request 110 that specifies source code 112. For example, the build environment 102 may be implemented at least in part by an IDE (e.g., as an extension of the IDE). The source code 112 may be created and/or edited within the IDE. In such instances, the build request 110 may be received by the IDE (e.g., from a user of the IDE). In additional or alternative implementations, the build requests 110 may be received from another computing device, such as a computing device associated with a user (e.g., a user who created or is requesting to deploy the source code 112). For example, the build environment 102 may include a network proxy configured to receive build requests 110 from multiple computing devices (e.g., IDEs executing on multiple computing devices). The source code 112 may be contained within the build request 110 and/or may be stored elsewhere (e.g., on another computing device, on a storage device, in a database, on a cloud computing system).

The source code 112 contains multiple lines 118, 120, 122, 124. Each of the lines may contain one or more commands written in a particular programming language (e.g., Java® Enterprise Edition, Jakarta® EE, and the like). To properly execute the command specified in the source code 112, the lines 118, 120, 122, 124 may need to be transformed into bytecode that is executable by a processor. To transform the source code 112, the build environment 102 may analyze the lines 118, 120, 122, 124 with a classifier 114. The classifier 114 may be configured to identify artifacts within the lines 118, 120, 122, 124. The artifacts may represent previously-compiled bytecode or other data that may be used to create application bytecode 116 for execution. In particular, the artifacts may include real artifacts 126, 128, which may correspond to artifacts stored in the centralized repository 106, and virtual artifacts 130, 132, which may correspond to artifacts stored in the local repository 104. Although depicted as individual lines, it should be understood that, in practice, the lines 118, 120, 122, 124 may represent more than one lines of code within the source code 112.

The centralized repository 106 may store real artifacts 152, 154 received from multiple build environments. For example, the centralized repository 106 may store real artifacts 152, 154 received from build environments associated with multiple computing domains and/or multiple organizations. The centralized repository 106 may receive the real artifacts and corresponding data for use when building applications. For example, some of the real artifacts 152, 154 stored within the centralized repository 106 may include corresponding bytecode 156, 158 that has been previously compiled for execution. As a specific example, the real artifacts 152 may correspond to a function call or API call that has been previously compiled into the bytecode 156. Upon detecting the real artifacts 152 (e.g., the function call or the API call) within source code, the corresponding bytecode 156 may be retrieved from the centralized repository 106 and added to application bytecode for execution. In certain implementations, the centralized repository 106 may be implemented as a Maven® repository. In certain implementations, the centralized repository 106 may be implemented as a global (e.g., publicly accessible) repository and/or maybe accessible within a particular organization (e.g., a particular company, a particular department, a particular team).

The local repository 104 may store artifacts in association with data for use in building applications, similar to the centralized repository 106. However, rather than storing real artifacts 152, 154, the local repository 104 may store virtual artifacts 148, 150. For example, unlike the centralized repository 106, the local repository 104 may not be centrally accessible (e.g., may not be publicly accessible, may not be accessible by computing devices outside of a particular organization). As explained further below, the virtual artifacts 148, 150 may represent bytecode 160, 162 that was previously transformed and then added to the local repository 104. For example, the virtual artifacts 148, 150 may represent a command to retrieve, from the local repository 104, bytecode that has been transformed. As a specific example, the virtual artifacts 148 may correspond to a Java Enterprise Edition function call that was previously transformed into bytecode 160 for a function call to a corresponding Jakarta EE function.

To identify the real artifacts 126, 128 and the virtual artifacts 130, 132, the classifier 114 may utilize one or more keywords. For example, artifacts may have corresponding names, ID numbers, and the like that may be used to identify the artifacts within the lines of the source code 112. For example, the classifier 114 may include a lookup table for artifacts (e.g., for lines 118, 120, 122, 124 of the source code 112 that correspond to previously-generated bytecode stored in association with a real artifact 126, 128 and/or a virtual artifacts 130, 132. In certain implementations, the classifier 114 may be implemented as more than one classifier. For example, in certain implementations, separate classifiers may be used to identify real artifacts 126, 128 and virtual artifacts 130, 132 within the source code 112. As a specific example, to identify virtual artifacts 130, 132, a Jakarta classifier may be defined that includes virtual artifacts for calls to functions within the Java Enterprise Edition namespace that require transformation into corresponding calls to functions within the Jakarta EE namespace. Additional classifiers may be added within the build environment 102 (e.g., may be added to the classifier 114) using a project object model associated with the source code 112 (not depicted). For example, to add the Jakarta classifier to the classifier 114, the Jakarta classifier may be invoked by adding $jakarta$ to the project object model.

Upon detecting a real artifact 126, 128 within the source code 112, the build environment 102 may retrieve, from the centralized repository 106, bytecode 136, 140 corresponding to the identified real artifact 126, 128. The retrieved bytecode 136, 140 may be added to the application bytecode 116. Upon detecting a virtual artifact 130, 132, the build environment may query the local repository 104 to determine whether the local repository 104 stores bytecode in association with the identified virtual artifact 130, 132. If it is determined that the local repository 104 stores bytecode corresponding to identify virtual artifacts, the bytecode may be retrieved from the local repository 104 and added to the application bytecode 116. For example, the local repository 104 may store the virtual artifact 130 in association with the bytecode 138. Accordingly, upon detecting the virtual artifact 130 within the source code 112, the build environment 102 may retrieve the bytecode 138 from the local repository 104 and add the bytecode 138 to the application bytecode 116. If corresponding bytecode for virtual artifact is not stored with the local repository 104, the build environment may generate bytecode to add to the application bytecode 116. In certain instances, the build environment 102 may generate bytecode directly based on a corresponding line. For example, the virtual artifact 132 may not be stored within the local repository 104. Accordingly, the build environment 102 may directly generate bytecode based on the line 124 source code 112. In instances where the line 124 includes instructions requiring one or more transformations, the build environment 102 may apply the transformations to the instructions specified in the line 124 prior to generating the bytecode. Additionally or alternatively, the build environment 102 may apply a bytecode transformation 134 after generating the bytecode. In still further instances, the classifier 114 may determine that the line 124 also corresponds to a real artifact stored within the central repository 106. In such instances, rather than generating new bytecode based on the line 124, the build environment 102 may retrieve corresponding bytecode from the centralized repository 106 and may apply the bytecode transformation 134 to the retrieved bytecode. In any of the above examples, the bytecode transformation 134 may be identified classifier 114. For example, the bytecode transformation 134 may correspond to the classifier 114 and/or may correspond to a particular virtual artifact within the classifier 114.

The build environment 102 includes a processor 144 and a memory 146. The processor 144 and the memory 146 may implement one or more aspects of the build environment 102. For example, the memory 146 may store instructions which, when executed by the processor 144, may cause the processor 144 to perform one or more operational features of the build environment 102. The processor 144 may be implemented as one or more central processing units (CPUs), field programmable gate arrays (FPGAs), and/or graphics processing units (GPUs) configured to use execute instructions stored on the memory 146. Additionally, the build environment 102 may be configured to communicate with the centralized repository 106 and/or with other computing devices (e.g., to receive build requests 110) using a network 108. For example, the build environment 102 may communicate with the network 108 using one or more wired network interfaces (e.g., Ethernet interfaces) and/or wireless network interfaces (e.g., Wi-Fi®, Bluetooth®, cellular data interfaces). In certain instances, the network 108 may be implemented as a local network (e.g., a local area network) and/or a global network (e.g., the Internet).

Further, the local repository 104 and/or the centralized repository 106 may be implemented by one or more computing devices. For example, although not depicted, one or more of the local repository 104 and the centralized repository 106 may contain a processor and a memory that implement at least one operational feature. For example, the memory may contain instructions which, when executed by the processor, cause the processor to implement at least one operational feature of the local repository 104 and/or the centralized repository 106.

In certain instances, the local repository 104 may be implemented by a computing device other than the computing device implementing the build environment 102. For example, the build environment 102 in the local repository 104 may communicate via a local network using one or more wired or wireless network interfaces. In additional or alternative implementations, the build environment 102 may at least partially implement the local repository 104. For example, the build environment 102 may maintain the local repository 104 as a local cache of virtual artifacts 148, 150 and corresponding bytecode 160, 162.

Figure 2:
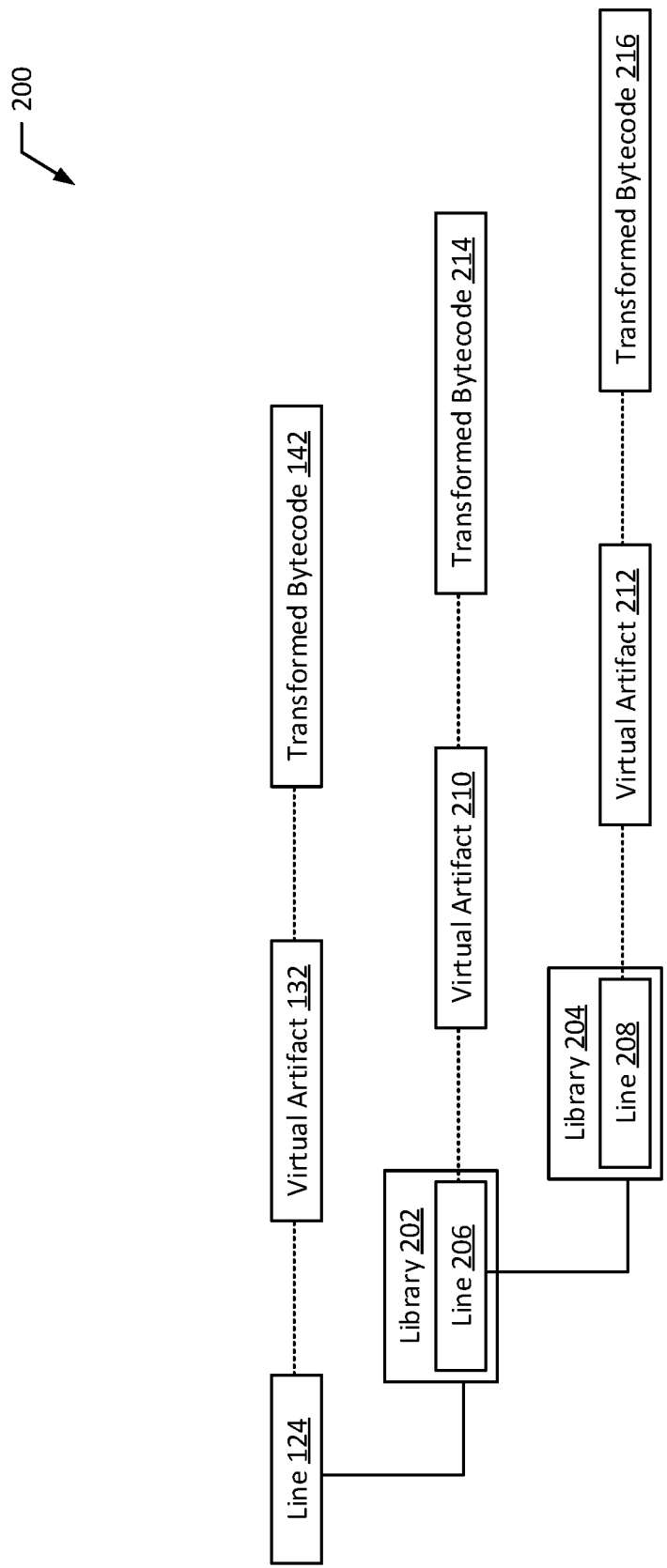
FIG. 2 illustrates a dependency mapping according to an exemplary embodiment of the present disclosure.

FIG. 2 illustrates a dependency mapping 200 according to an exemplary embodiment of the present disclosure. The dependency mapping 200 may represent a process by which the build environment 102 detects dependencies within source code 112 that require transformation in order to generate proper application bytecode 116. Dependencies may include lines within source code 112 that include calls to other functions or application programming interfaces (APIs) external to the source code 112. As an example, a line within the source code 112 may include a call to a function that relies on an older version of the Java Enterprise Edition (e.g., a function that includes lines prepared based on the Java Enterprise Edition namespace instead of the Jakarta EE namespace). Such situations may arise when the source code 112 relies on libraries of functions that have not been updated, or that may not be updated in the foreseeable future. A developer may not have access to the underlying source code for the functions within such libraries and may therefore be unable to alter the function calls themselves. Rather, the developer may only be able to access executable versions (e.g., bytecode versions) of the functions (e.g., as artifacts stored within the centralized repository 106). Accordingly, the bytecode for these functions may need to be transformed before being added to the application bytecode 116.

Dependencies within the source code 112 may be identified based on a project object model corresponding to the source code 112. For example, the project object model may include a call to a library 202 that has not been updated (i.e., "oldlib"). As a specific example, the project object model may indicate that the library 202 is used by stating:

com.old
   oldlib
   1.0

This call may specify that the source code 112 relies on version 1.0 of the oldlib library 202 with group ID "com.old." The source code 112 may be analyzed for lines that include a call to one or more functions within the oldlib library 202. For example, functions within the oldlib library 202 may be called as "oldlib.function( )", with "function" representing the name of the function and with any parameters for the function being included between the parentheses. Dependencies may be detected as lines that contain such function calls to other libraries. In one such example, the line 124 may include a call to an oldlib library 202 function.

After detecting a dependency for a line 124, the build environment 102 may process the dependency (e.g., the library 202 and/or a function called by the line 124). The build environment 102 may analyze lines of a called function within the library 202 to determine whether any of the lines correspond to virtual artifacts that require bytecode transformation. For example, the classifier 114 may analyze lines of source code or lines of bytecode for a function within the library 202 to detect virtual artifacts. In one such instance, the classifier 114 may determine that at least one line 206 of the function corresponds to a virtual artifact 210.

This process may be repeated. For example, the line 206 may call a further function in another library 204. Lines corresponding to this function may be analyzed by the classifier 114 and a line 208 corresponding to a virtual artifact 212 may be identified. This process may be repeated until all dependencies for the line 124 have been analyzed. Similarly, the above-described process may be repeated for all lines within the source code 112 that include dependencies.

Once detected, virtual artifacts 132, 210, 212 may be processed as discussed above (e.g., by retrieving corresponding bytecode from the local repository 104 and/or by transforming bytecode with a corresponding bytecode transformation 134) to generate transformed bytecode 142, 214, 216 for inclusion within the application bytecode 116. In certain instances, the virtual artifacts 132, 210, 212 may be processed into transformed bytecode 142 as they are identified within the lines 124, 206, 208. In additional or alternative implementations, the classifier 114 and the build environment 102 may finish detecting all of the virtual artifacts 132, 210, 212 (e.g., all virtual artifacts for dependencies of a line 124 and/or all virtual artifacts for all lines and all dependencies within the source code 112) and may then generate the corresponding transformed bytecode 142, 214, 216.

Similar techniques may also be used for lines 118, 122 corresponding to real artifacts 126, 128. For example, one or more of the real artifacts 126, 128 may correspond to bytecode that includes dependencies from other libraries 202, 204. Accordingly, lines for bytecode 136, 140 retrieved from the centralized repository 106 may similarly be analyzed for dependencies that correspond to virtual artifacts.

Figure 3:
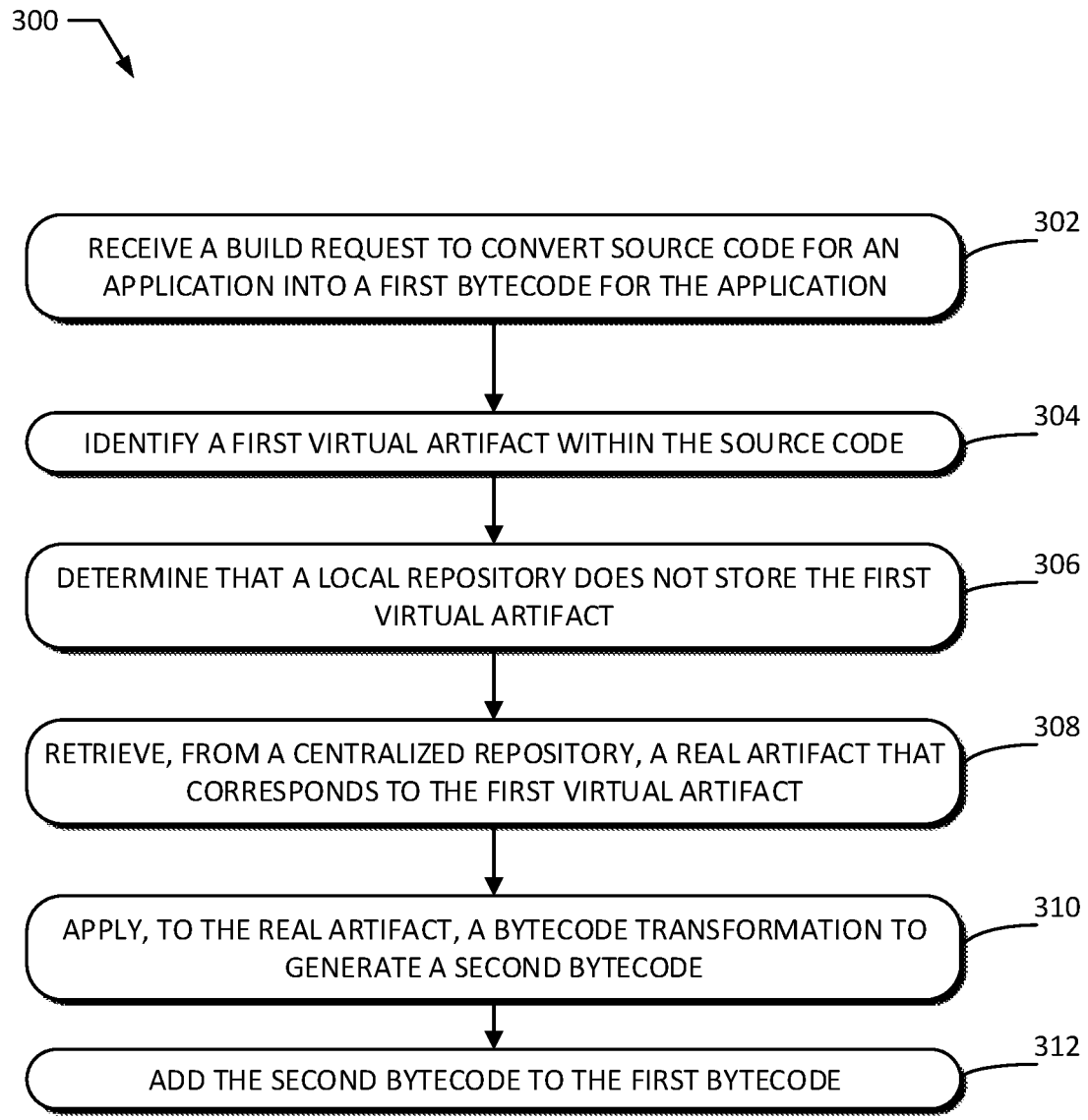
FIG. 3 illustrates a method for generating bytecode using virtual artifacts according to an exemplary embodiment of the present disclosure.

FIG. 3 illustrates a method 300 for generating bytecode using virtual artifacts according to an exemplary embodiment of the present disclosure. The method 300 may be implemented on a computer system, such as the system 100. For example, the method 300 may be implemented by the build environment 102, the local repository 104, and/or the centralized repository 106. The method 300 may also be implemented by a set of instructions stored on a computer readable medium that, when executed by a processor, cause the computer system to perform the method 300. For example, all or part of the method 300 may be implemented by the processor 144 in the memory 146. Although the examples discussed below are described with reference to the flowchart illustrated in FIG. 3, many other methods of performing the acts associated with FIG. 3 may be used. For example, the order of some of the blocks may be changed, certain blocks may be combined with other blocks, one or more of the blocks may be repeated, and some of the blocks described may be optional.

The method 300 may begin with receiving a build request to convert source code for an application to a first bytecode for the application (block 302). For example, the build environment 102 may receive a build request 110 from another computing device. The build request 110 may specify source code 112 for an application to be converted into application bytecode 116 that may be used to execute the application.

A first virtual artifact may be identified within the source code (block 304). For example, the build environment 102 may detect a virtual artifact 132 within the source code 112. In particular, the virtual artifact 132 may be identified by a classifier 114. The source code 112 may include one or more lines 118, 120, 122, 124 of code to be converted into bytecode for the application bytecode 116. The classifier 114 may be configured to analyze the lines 118, 120, 122, 124 to identify artifacts including real artifacts 126, 128 and virtual artifacts 130, 132. In particular, the classifier 114 may include a separate classifier to detect virtual artifacts 130, 132. Using the separate classifier, the classifier 114 may detect the virtual artifact 132 within the line 124. In particular, the virtual artifact may be detected based on a function call, an API call, and the like within the line 124. In one specific example, the 124 may include a call to a Java Enterprise Edition (e.g., "javax") function to create a servlet function, i.e., "javax.servlet.Servlet". A virtual artifact 132 may be identified that corresponds to the Java Enterprise Edition function call. For example, as explained above, Java Enterprise Edition function calls may no longer be supported for use in application bytecode and may therefore be added to the classifier 114 (e.g., the $jakarta$ classifier) for identification as virtual artifacts 132.

It may be determined that a local repository does not store the first virtual artifact (block 306). For example, in response to identifying the virtual artifact 132, the build environment 102 may query the local repository 104 to determine whether the virtual artifact 132 and corresponding bytecode is stored within the local repository 104. The build environment 102 may receive a response indicating that the virtual artifact 132 is not stored within the local repository 104. Accordingly, the build environment 102 may determine that transformed bytecode needs to be generated for the virtual artifact 132.

A real artifact may be retrieved from a centralized repository that corresponds to the first virtual artifact (block 308). For example, the build environment 102 may retrieve a real artifact from the centralized repository 106 that corresponds to the virtual artifact 132. As a specific example, the real artifact 154 may correspond to a call to the Java function for creating a server socket (i.e., "javax.servlet.Servlet"). Accordingly, the bytecode 158 corresponding to the real artifact 154 may be performed to implement or call the function within the outdated Java Enterprise Edition environment. The build environment 102 may retrieve the bytecode 158 from the centralized repository 106 (e.g., via the network 108).

A bytecode transformation may be applied to the real artifact to generate a second bytecode (block 310). For example, the build environment 102 may apply a bytecode transformation 134 to the bytecode 158 associated with the real artifact 154. Applying the bytecode transformation 134 may generate a transformed bytecode 142 (e.g., a second bytecode). As explained above, the bytecode transformation 134 may correspond to the classifier 114 and/or to a particular type of virtual artifact 132. Continuing the previous example, the bytecode transformation 134 may be configured to transform calls to Java Enterprise Edition functions into calls to equivalent Jakarta EE functions. For example, the bytecode transformation 134 may replace the "javax-servlet.Servlet" function call with a "jakarta.servlet.Servlet" function call within the bytecode 158. In the above example, it is assumed that the Java Enterprise Edition and Jakarta EE namespaces have a similar structure. However, in other examples, the namespace may have different structures. For example, in such instances, the bytecode transformation 134 may replace the "javax.servlet.Servlet" function call with a "jakartaservlet.Servlet" function call. Accordingly, the bytecode transformation 134 may include one or more mappings between particular portions are subsets of the Java Enterprise Edition namespace and corresponding portions of the Jakarta namespace. In additional or alternative implementations, the bytecode transformation 134 may include further substitutions. For example, where a bytecode transformation is performed to update or change the functionality of functions implemented by the bytecode receiving the centralized repository, the bytecode transformation 134 may rewrite or replace one or more functional lines of the bytecode.

The second bytecode may be added to the first bytecode (block 312). For example, after generating the transformed bytecode 142, the build environment 102 may add the transformed bytecode 142 to the application bytecode 116. In certain instances, the transformed bytecode 142 may be stored within the local repository 104. For example, an indication of the virtual artifact 132 (e.g., a group ID and an artifact name) may be stored in association with the transformed bytecode 142 within the local repository 104 for use in processing additional lines within the source code 112 and other source code that contain the virtual artifact 132. Additionally or alternatively, the build environment 102 may add the transformed bytecode 142 to the centralized repository 106.

In the method 300, it is assumed that the first virtual artifact does not have corresponding bytecode stored within the local repository 104. However, in certain instances, virtual artifacts 130 identified by the classifier 114 may include corresponding bytecode stored in the local repository 104. In such instances, processing of the virtual artifact may differ from the method 300.

Figure 4:
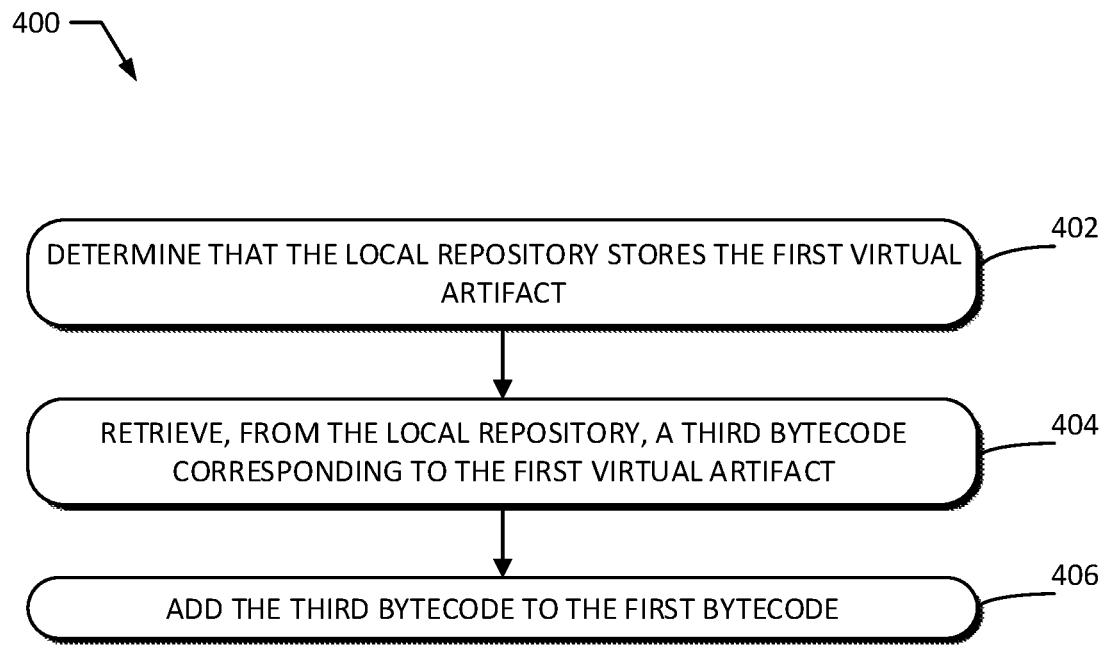
FIG. 4 illustrates a method for utilizing stored virtual artifacts according to an exemplary embodiment of the present disclosure.

In particular, FIG. 4 illustrates a method 400 for utilizing stored virtual artifacts according to an exemplary embodiment of the present disclosure. The method 400 may be performed in addition to or instead of at least a portion of the method 300. For example, the method 400 may be performed after identifying a first virtual artifact at block 304. The method 400 may be implemented on a computer system, such as the system 100. For example, the method 400 may be implemented by the build environment 102, the local repository 104, and/or the centralized repository 106. The method 400 may also be implemented by a set of instructions stored on a computer readable medium that, when executed by a processor, cause the computer system to perform the method 400. For example, all or part of the method 400 may be implemented by the processor 144 and the memory 146. Although the examples discussed below are described with reference to the flowchart illustrated in FIG. 4, many other methods of performing the acts associated with FIG. 4 may be used. For example, the order of some of the blocks may be changed, certain blocks may be combined with other blocks, one or more of the blocks may be repeated, and some of the blocks described may be optional.

The method 400 may begin with determining that the local repository stores the first virtual artifact (block 402). For example, the build environment 102 may query the local repository 104 and determine that the local repository 104 stores bytecode corresponding to the virtual artifact 130. As explained above, the artifacts identified by the classifier 114 may include one or more of a group ID and in artifact name. The virtual artifact 130 may be identified with the local repository based on one or both of the group ID and the artifact name.

A third bytecode corresponding to the first virtual artifact may be retrieved in the local repository (block 404). For example, the build environment 102 may request the bytecode 138 corresponding to the virtual artifact 130 from the local repository 104 and may receive the bytecode 138 from the local repository 104. The third bytecode may be added to the first bytecode (block 406). For example, the build environment 102 may add the bytecode 138 received from the local repository 104 to the application bytecode 116.

The methods 300, 400 may enable the environment 102 to perform bytecode transformations as needed using artifacts. Furthermore, the bytecode transformations may be performed and coordinated using existing artifact structures and mechanisms (e.g., within IDEs). In particular, the methods 300, 400 enable the extension of existing artifact structures and build tools using virtual artifacts to detect when bytecode needs to be transformed and to coordinate which bytecode transformations are performed. In this way, the methods 300, 400 can ensure compatibility of generated application bytecode without having to add additional tools to the build and deployment pipeline for applications. Furthermore, by utilizing a local repository 104 to retrieve previously transformed bytecode, methods 300, 400 reduced the processing time required to transform bytecode, as redundant transformations are avoided.

It should also be noted that, although many of the examples discussed herein focus on transforming bytecode from Java Enterprise Edition calls to Jakarta EE calls, the techniques may similarly be used to ensure bytecode compatibility more generally. As a specific example, other changes (e.g., to network configurations, operating system requirements, and the like) may render one version of a library used by an application incompatible with the application or with another library utilized by the application. In such instances, bytecode transformations may be applied to update configurations and/or adjust the operation of the incompatible libraries. In another example, a function called within the source code may be changed (e.g., a change in name and/or inputs). In such instances, calls to the function may be detected and updated at build time (e.g., using bytecode transformation) to ensure that the function calls are up-to-date.

Figure 5:
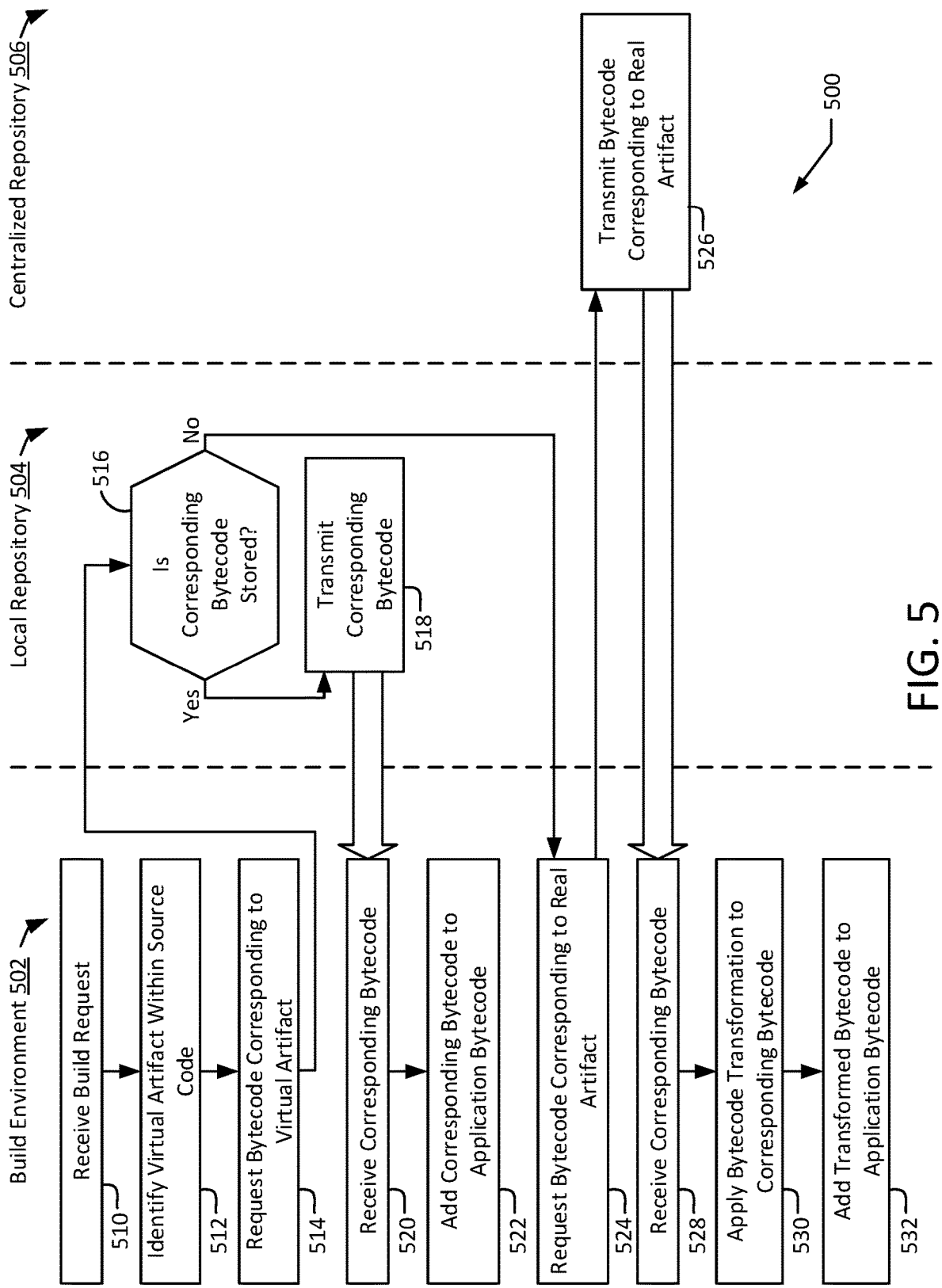
FIG. 5 illustrates a flowchart of a method for generating application bytecode according to an exemplary embodiment of the present disclosure.

FIG. 5 illustrates a flowchart 500 of a method for transforming bytecode according to an exemplary embodiment of the present disclosure. The method may be performed by a computing system, such as the system 100. For example, the flowchart 500 includes a build environment 502, which may be an exemplary implementation of the build environment 102, a local repository 504, which may be an exemplary implementation of the local repository 104, and a centralized repository 506, which may be an exemplary implementation of the centralized repository 106. The method may also be implemented by a set of instructions stored on a computer readable medium that, when executed by a processor, cause the computer system to perform the method. For example, all or part of the method may be implemented by the processor 144 and the memory 146. Although the examples discussed below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks described may be optional.

The method may begin with the build environment 502 receiving a build request (block 510). The build request may specify source code that is to be converted into application bytecode for execution. A virtual artifact may be identified within the source code (block 512). For example, the virtual artifact may be identified by a classifier of the build environment 502 and may correspond to lines within the source code that may need to be transformed (e.g., to ensure compatibility). In response to identifying the virtual artifact, the build environment 502 may request bytecode corresponding to the virtual artifact from the local repository 504 (block 514).

The local repository 504 may determine whether bytecode corresponding to the virtual artifact is stored with the local repository 504 (block 516). For example, the local repository 504 may determine whether a virtual artifact with the same group ID and/or artifact name has been added to the local repository 504. If corresponding bytecode is stored within the local repository 504, the local repository 504 may transmit the corresponding bytecode (block 518). The build environment 502 may receive the corresponding bytecode (block 520) and may add the corresponding bytecode to the application bytecode (block 522). For example, the build environment 502 may perform techniques similar to those discussed above in connection with the method 400 to add the corresponding bytecode to the application bytecode.

If the local repository 504 does not store corresponding bytecode, the build environment 502 may request bytecode corresponding to a real artifact from the centralized repository 506 (block 524). In particular, the build environment 502 may request bytecode for a real artifact that corresponds to the virtual artifact. The centralized repository may then transmit the corresponding bytecode (block 526) and the build environment may receive the corresponding bytecode (block 528). The build environment 502 may then apply the bytecode transformation to the corresponding bytecode (block 530). For example, the build environment 502 may apply a bytecode transformation corresponding to the virtual artifact to generate a transformed bytecode. The transformed bytecode may be added to an application bytecode (block 532). For example, the build environment 502 may add the transformed bytecode to an application bytecode generated in response to the received build request.

The method may enable build environments to responsively identify which virtual artifacts have been previously transformed. In particular, the method may enable the build environment 502 to determine when a local repository already stores corresponding bytecode and to utilize the previously stored bytecode when possible to reduce processing time required to generate and transform an application bytecode in response to the build request. Furthermore, even when the local repository does not store a corresponding bytecode, the build environment 502 may retrieve and transform bytecode from the centralized repository 506. This may further reduce the frequency with which the build environment 502 is required to generate bytecode for virtual artifacts from scratch. Accordingly, these techniques increase the responsiveness bytecode generation while still enabling the transformation of bytecode where necessary to assure compatibility.

Figure 6:
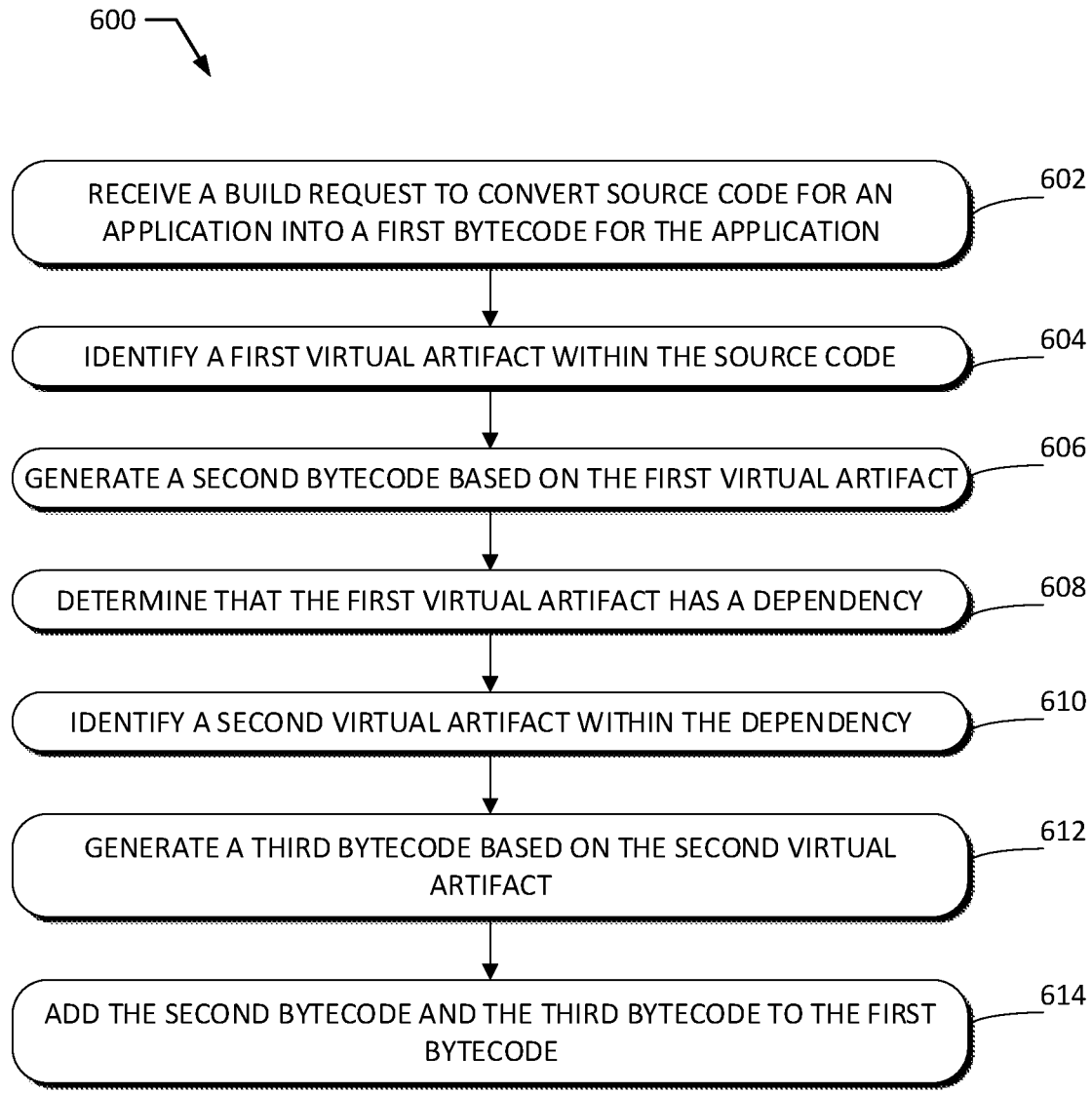
FIG. 6 illustrates a method for processing artifact dependencies according to an exemplary embodiment of the present disclosure.

FIG. 6 illustrates a method 600 for processing artifact dependencies according to an exemplary embodiment of the present disclosure. The method 600 may be implemented on a computer system, such as the system 100. For example, the method 600 may be implemented by the build environment 102, the local repository 104, and/or the centralized repository 106. The method 600 may also be implemented by a set of instructions stored on a computer readable medium that, when executed by a processor, cause the computer system to perform the method 600. For example, all or part of the method 600 may be implemented by the processor 144 and the memory 146. Although the examples discussed below are described with reference to the flowchart illustrated in FIG. 6, many other methods of performing the acts associated with FIG. 6 may be used. For example, the order of some of the blocks may be changed, certain blocks may be combined with other blocks, one or more of the blocks may be repeated, and some of the blocks described may be optional.

The method 600 may begin with receiving a build request to convert source code for an application into a first bytecode for the application (block 602). A first virtual artifact may be identified within the source code (block 604). A second bytecode may be generated based on the first virtual artifact (block 606). Blocks 602-606 may be implemented using techniques similar to those discussed above in connection with the methods 300, 400. For example, block 602 may be implemented with techniques similar to those discussed above in connection with block 302 and block 604 may be implemented with techniques similar to those discussed above in connection with block 304. Further, block 606 may be implemented using techniques similar to those discussed above in connection with blocks 306-312 and/or blocks 402-406.

It may be determined that the first virtual artifact has a dependency (block eight). For example, the build environment 102 may determine that the first virtual artifact 130, 132 has a dependency. In particular, it may be determined that a line 124 of the source code 112 corresponding to the first virtual artifact 132 has a dependency. As explained above, the dependency may be identified based on a project object model corresponding to the source code 112 and/or a function code within the line 124. In one example, the source code 112 may be received for an application that operates as a servlet function on a server. The application and the source code 112 may be configured to use the Jakarta EE servlet API. However, the application may still depend on a library 202 that utilizes the Java Enterprise Edition servlet API, and the developer may not have access to the source code for the library. In such instances, the line 124 may call a function within the library 202 and may accordingly be identified as a dependency of the first virtual artifact corresponding to the line 124.

A second virtual artifact may be identified within the dependency (block 610). For example, the build environment 102 may identify a second virtual artifact 210 within the dependency. In certain instances, as explained above, the classifier 114 may analyze lines of source code or bytecode within a corresponding library 202 for the dependency. The virtual artifacts 210 may be identified as a function call within a line 206 of the dependency that requires transformation (e.g., a function call to the outdated Java Enterprise Edition servlet API).

A third bytecode may be generated based on the second virtual artifact (block 612). For example, the build environment 102 may generate the third bytecode 214 based on the line 206. In particular, the third bytecode 214 may be generated using techniques similar to those used to generate the second bytecode 138, 142 based on virtual artifacts 130, 132 for the source code 112. In particular, the third bytecode 214 may be generated by performing, at least in part, the method 300 (e.g., blocks 306-310) and/or the method 400 (e.g., blocks 402-404). Continuing the previous example, the third bytecode 214 may be generated to transform function calls to the outdated Java Enterprise Edition servlet API into function calls to the Jakarta EE servlet API.

The second bytecode and the third bytecode may be added to the first bytecode (block 614). For example, the second bytecode 142 and the third bytecode 214 may be added to the application bytecode 116. In certain instances, after generating the third bytecode, the build environment 102 may store the third bytecode within the local repository 104 in association with an identifier of the second virtual artifact 210, using techniques similar to those discussed above in connection with storing the transformed bytecode 142. In certain implementations, such as those depicted in the dependency mapping 200, a function or library 202 upon which the source code 112 depends may have an additional dependency on another library 204. In such instances, the method 600 may be at least partially repeated to process and generate bytecode for the additional dependency. For example, blocks 608-612 may be repeated to identify and generate bytecode for at least a subset of the dependencies of the source code 112.

In this way, the method 600 enables the bytecode transformation techniques discussed above to detect and account for dependencies within the source code 112 and other libraries utilized by the source code 112. Accordingly, the method 600 allows for bytecode transformations to be performed even when source code for dependencies is not available, thereby ensuring compatibility of libraries and other functions even when the functions themselves are out of date.

Figure 7:
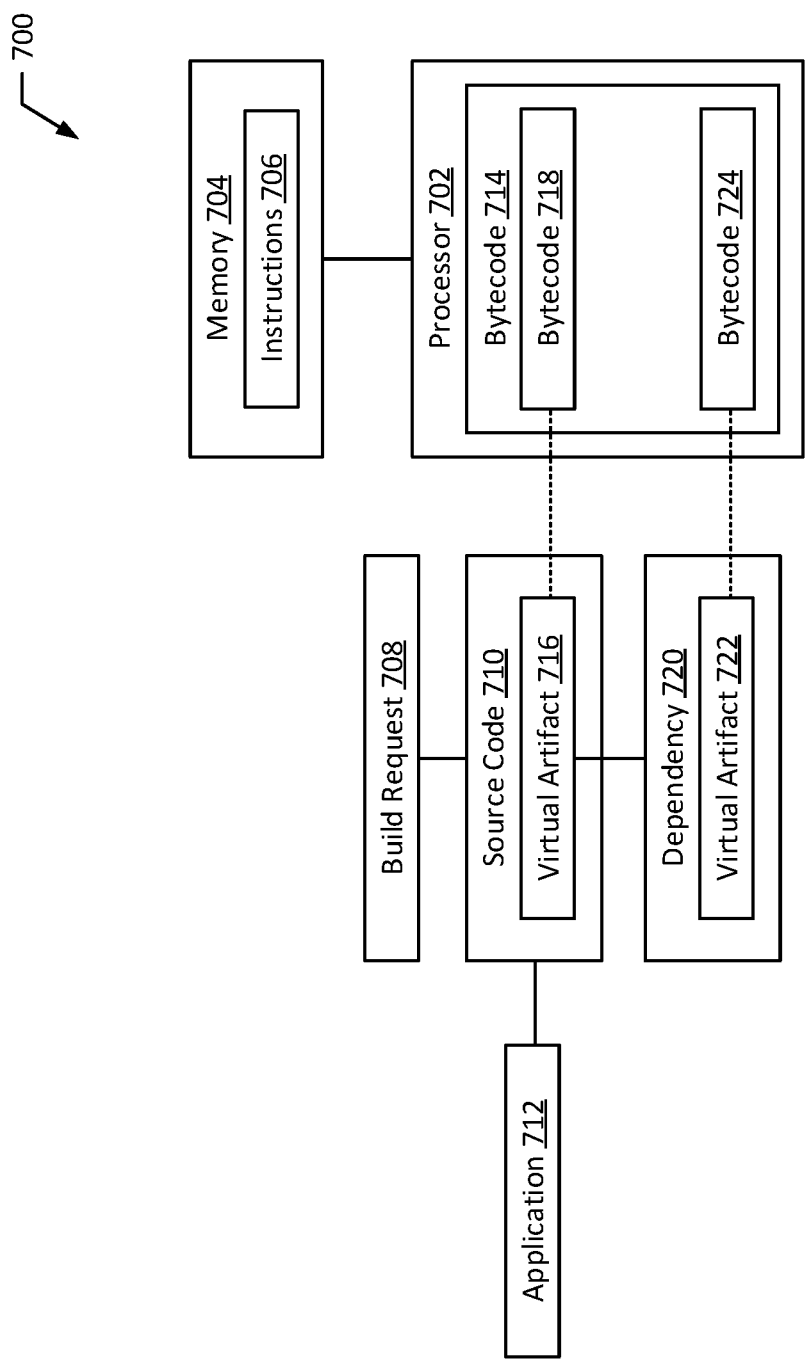
FIG. 7 illustrates a system according to an exemplary embodiment of the present disclosure.

FIG. 7 illustrates a system 700 according to an exemplary embodiment of the present disclosure. The system 700 includes a processor 702 and a memory 704. The memory 704 may store instructions 706. When executed by the processor 702, the instructions 706 may cause the processor 702 to receive a build request 708 to convert source code 710 for an application 712 into a first bytecode 714 for the application 712. When executed, the instructions 706 may also cause the processor 702 to identify a first virtual artifact 716 within the source code 710 and to generate a second bytecode 718 based on the first virtual artifact 716. The instructions 706 may also cause the processor 702 to determine that the first virtual artifact 716 has a dependency 720 and to identify a second virtual artifact 722 within the dependency 720. A third bytecode 724 may be generated based on the second virtual artifact 718, and the second bytecode 718 and the third bytecode 724 may be added to the first bytecode 714.

Aspects of the subject matter described herein may be useful alone or in combination with one or more aspects described herein. In a first aspect, a method is provided that includes receiving a build request to convert source code for an application into a first bytecode for the application and identifying a first virtual artifact within the source code. The method may further include determining that a local repository does not store the first virtual artifact and retrieving, from a centralized repository, a real artifact that corresponds to the first virtual artifact. The method may also include applying, to the real artifact, a bytecode transformation to generate a second bytecode and adding the second bytecode to the first bytecode.

In a second aspect according to the first aspect, the method further includes determining that the local repository stores the first virtual artifact and retrieving, from the local repository, a third bytecode corresponding to the first virtual artifact. The third bytecode may be added to the first bytecode.

In a third aspect according to any of the first through second aspects, the first virtual artifact represents a command to retrieve, from the local repository, bytecode that has been transformed.

In a fourth aspect according to the third aspect, the first bytecode is generated at least in part based on real artifacts stored in the centralized repository.

In a fifth aspect according to any of the third and fourth aspects, the first virtual artifact is identified by a classifier of a build environment that receives the build request.

In a sixth aspect according to the fifth aspect, the build environment is an extension of an integrated development environment.

In a seventh aspect according to any of the fifth through sixth aspects, the build environment includes a network proxy that receives build requests from multiple computing environments.

In an eighth aspect according to the first aspect, the method further includes storing the second bytecode in the local repository in association with the first virtual artifact.

In a ninth aspect according to any of the first through eighth aspects, the method is performed to transform Java Enterprise Edition library calls to Jakarta EE library calls.

In a tenth aspect, a system is provided that includes a processor and a memory. The memory may store instructions which, when executed by the processor, cause the processor to receive a build request to convert source code for an application into a first bytecode for the application and identify a first virtual artifact within the source code. The instructions may further cause the processor to determine that a local repository does not store the first virtual artifact and retrieve, from a centralized repository, a real artifact that corresponds to the first virtual artifact. The instructions may also cause the processor to apply, to the real artifact, a bytecode transformation to generate a second bytecode and add the second bytecode to the first bytecode.

In an eleventh aspect according to the tenth aspect, the memory stores further instructions which, when executed by the processor, cause the processor to determine that the local repository stores the first virtual artifact and retrieve, from the local repository, a third bytecode corresponding to the first virtual artifact. The third bytecode may be added to the first bytecode.

In a twelfth aspect according to any of the tenth and eleventh aspects, the first virtual artifact represents a command to retrieve, from the local repository, bytecode that has been transformed.

In a thirteenth aspect according to the twelfth aspect, the first bytecode is generated at least in part based on real artifacts stored in the centralized repository.

In a fourteenth aspect according to any of the twelfth and thirteenth aspects, the first virtual artifact is identified by a classifier of a build environment that receives the build request.

In a fifteenth aspect according to the fourteenth aspect, the build environment is an extension of an integrated development environment.

In a sixteenth aspect according to any of the fourteenth and fifteenth aspects, the build environment includes a network proxy that receives build requests from multiple computing environments.

In a seventeenth aspect according to any of the tenth through sixteenth aspects, the memory stores further instructions which, when executed by the processor, cause the processor to store the second bytecode in the local repository in association with the first virtual artifact.

In an eighteenth aspect a non-transitory, computer-readable medium is provided storing instructions which, when executed by a processor, cause the processor to receive a build request to convert a source code an application into a first bytecode for the application and identify a first virtual artifact within the source code. The instructions may also cause the processor to determine that a local repository does not store the first virtual artifact and retrieve, from a centralized repository, a real artifact that corresponds to the first virtual artifact. The instructions may further cause the processor to apply, to the real artifact, a bytecode transformation to generate a second bytecode and add the second bytecode to the first bytecode.

In a nineteenth aspect, a system is provided that includes receiving means configured to receive a build request to convert a source code an application into a first bytecode for the application and identifying means configured to identify a first virtual artifact within the source code. The system may further include determining means configured to determine that a local repository does not store the first virtual artifact and retrieving means configured to retrieve, from a centralized repository, a real artifact that corresponds to the first virtual artifact. The system may also include transforming means configured to apply, to the real artifact, a bytecode transformation to generate a second bytecode and bytecode generation means configured to add the second bytecode to the first bytecode.

In a twentieth aspect, a method is provided that includes receiving a build request to convert source code for an application into a first bytecode for the application and identifying a first virtual artifact within the source code. The method may further include generating a second bytecode based on the first virtual artifact, determining that the first virtual artifact has a dependency, and identifying a second virtual artifact within the dependency. The method may also include generating a third bytecode based on the second virtual artifact and adding the second bytecode and the third bytecode to the first bytecode.

In a twenty-first aspect according to the twentieth aspect, generating the second bytecode includes determining that a local repository does not store the first virtual artifact, retrieving, from a centralized repository, a real artifact that corresponds to the first virtual artifact, and applying, to the real artifact, a bytecode transformation to generate the second bytecode.

In a twenty-second aspect according to any of the twentieth through twenty-first aspects, generating the second bytecode includes determining that a local repository stores the first virtual artifact and retrieving, from the local repository, the second bytecode corresponding to the first virtual artifact.

In a twenty-third aspect according to any of the twentieth through twenty-second aspects, the first virtual artifact represents a command to retrieve, from the local repository, bytecode that has been transformed.

In a twenty-fourth aspect according to the twenty-third aspect, the first bytecode is generated at least in part based on real artifacts stored in a centralized repository.

In a twenty-fifth aspect according to any of the twenty-third and twenty-fourth aspects, the first virtual artifact is identified by a classifier of a build environment that receives the build request.

In a twenty-sixth aspect according to the twenty-fifth aspect, the build environment is an extension of an integrated development environment.

In a twenty-seventh aspect according to any of the twenty-fifth and twenty-sixth aspects, the build environment includes a network proxy that receives build requests from multiple computing environments.

In a twenty-eighth aspect according to any of the twentieth through twenty-seventh aspects, the method further includes storing the second bytecode in the local repository in association with the first virtual artifact.

In a twenty-ninth aspect according to any of the twentieth through twenty-eighth aspects, the method is performed to transform Java Enterprise Edition library calls to Jakarta EE library calls.

In a thirtieth aspect, a system is provided that includes a processor and a memory. The memory may store instructions which, when executed by the processor, cause the processor to receive a build request to convert source code for an application into a first bytecode for the application, identify a first virtual artifact within the source code, and generate a second bytecode based on the first virtual artifact. The instructions may also cause the processor to determine that the first virtual artifact has a dependency and identify a second virtual artifact within the dependency. The instructions may further cause the processor to generate a third bytecode based on the second virtual artifact and add the second bytecode and the third bytecode to the first bytecode.

In a thirty-first aspect according to the thirtieth aspect, generating the second bytecode includes determining that a local repository does not store the first virtual artifact, retrieving, from a centralized repository, a real artifact that corresponds to the first virtual artifact, and applying, to the real artifact, a bytecode transformation to generate the second bytecode.

In a thirty-second aspect according to any of the thirtieth and thirty-first aspects, generating the second bytecode includes determining that a local repository stores the first virtual artifact and retrieving, from the local repository, the second bytecode corresponding to the first virtual artifact.

In a thirty-third aspect according to any of the thirtieth through thirty-second aspects, the first virtual artifact represents a command to retrieve, from the local repository, bytecode that has been transformed.

In a thirty-fourth aspect according to the thirty-third aspect, the first bytecode is generated at least in part based on real artifacts stored in a centralized repository.

In a thirty-fifth aspect according to any of the thirty-third and thirty-fourth aspect, the first virtual artifact is identified by a classifier of a build environment that receives the build request.

In a thirty-sixth aspect according to the thirty-fifth aspect, the build environment is an extension of an integrated development environment.

In a thirty-seventh aspect according to any of the thirty-fifth and thirty-sixth aspects, the build environment includes a network proxy that receives build requests from multiple computing environments.

In a thirty-eighth aspect according to any of the thirtieth through thirty-seventh aspects, the instructions further cause the processor to store the second bytecode in the local repository in association with the first virtual artifact.

In a fortieth aspect, a non-transitory, computer-readable medium is provided storing instructions which, when executed by a processor, cause the processor to receive a build request to convert source code for an application into a first bytecode for the application and identify a first virtual artifact within the source code. The instructions may further cause the processor to generate a second bytecode based on the first virtual artifact, determine that the first virtual artifact has a dependency, and identify a second virtual artifact within the dependency. The instructions may also cause the processor to generate a third bytecode based on the second virtual artifact and add the second bytecode and the third bytecode to the first bytecode.

In a forty-first aspect, a system is provided that includes receiving means configured to receive a build request to convert source code for an application into a first bytecode for the application and identifying means configured to identify a first virtual artifact within the source code. The system may also include determining means configured to determine that the first virtual artifact has a dependency, wherein the identifying means are further configured to identify a second virtual artifact within the dependency. The system may further include bytecode generation means configured to generate a second bytecode based on the first virtual artifact, generate a third bytecode based on the second virtual artifact, and add the second bytecode and the third bytecode to the first bytecode.

To the extent that any of these aspects are mutually exclusive, it should be understood that such mutual exclusivity shall not limit in any way the combination of such aspects with any other aspect whether or not such aspect is explicitly recited. Any of these aspects may be claimed, without limitation, as a system, method, apparatus, device, medium, etc.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

It should be understood that various changes and modifications to the examples described here will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method comprising:
receiving a build request to convert source code for an application into application bytecode, wherein the application bytecode includes a first bytecode for the application;
identifying a virtual artifact within the source code;
requesting second bytecode associated with the virtual artifact from a local repository;
in response to determining that the local repository does not store the second bytecode associated with the virtual artifact, retrieving, from a centralized repository, third bytecode associated with a real artifact that corresponds to the virtual artifact;
applying a bytecode transformation to the third bytecode associated with the real artifact, wherein the bytecode transformation involves replacing at least a portion of the third bytecode to thereby generate a fourth bytecode, wherein the fourth bytecode is configured for use with a different operating system or a different runtime environment than the third bytecode; and
adding the fourth bytecode to the application bytecode.

2. The method of claim 1, further comprising:
determining that the local repository stores the virtual artifact;
retrieving, from the local repository, a fifth bytecode corresponding to the virtual artifact; and
adding the fifth bytecode to the first application bytecode.

3. The method of claim 1, wherein the virtual artifact represents a command to retrieve, from the local repository, the first bytecode that has been transformed.

4. The method of claim 3, wherein the first bytecode is generated based at least in part on real artifacts stored in the centralized repository.

5. The method of claim 3, wherein the virtual artifact is identified by a classifier of a build environment that receives the build request and identifies the virtual artifact and the real artifact as representing previously-compiled bytecode for the application stored in the local repository and the centralized repository, respectively.

6. The method of claim 5, wherein the build environment is an extension of an integrated development environment.

7. The method of claim 5, wherein the build environment includes a network proxy that receives build requests from multiple computing environments.

8. The method of claim 5, wherein the classifier is configured to determine whether a line of the source code corresponds to the virtual artifact or the real artifact, and wherein the classifier is further configured to identify the bytecode transformation used to generate the fourth bytecode.

9. The method of claim 1, further comprising storing the fourth bytecode in the local repository in association with the virtual artifact.

10. A system comprising:
a processor; and
a memory storing instructions which, when executed by the processor, cause the processor to:
receive a build request to convert source code for an application into application bytecode, wherein the application bytecode includes a first bytecode for the application;
identify a virtual artifact within the source code;
request second bytecode associated with the virtual artifact from a local repository;
in response to determining that the local repository does not store the second bytecode associated with the virtual artifact, retrieve, from a centralized repository, third bytecode associated with a real artifact that corresponds to the virtual artifact;
apply a bytecode transformation to the third bytecode associated with the real artifact, wherein the bytecode transformation involves replacing at least a portion of the third bytecode to thereby generate a fourth bytecode, wherein the fourth bytecode is configured for use with a different operating system or a different runtime environment than the third bytecode; and
add the fourth bytecode to the application bytecode.

11. The system of claim 10, wherein the instructions are further executable by the processor for causing the processor to:
determine that the local repository stores the second bytecode associated with the virtual artifact; and
retrieve, from the local repository, the second bytecode corresponding to the virtual artifact.

12. The system of claim 10, wherein the virtual artifact represents a command to retrieve, from the local repository, the first bytecode that has been transformed.

13. The system of claim 12, wherein the first bytecode is generated based at least in part on real artifacts stored in the centralized repository.

14. The system of claim 12, wherein the virtual artifact is identified by a classifier of a build environment that receives the build request.

15. The system of claim 14, wherein the build environment is an extension of an integrated development environment.

16. The system of claim 14, wherein the build environment includes a network proxy that receives build requests from multiple computing environments.

17. The system of claim 14, wherein the classifier is configured to determine whether a line of the source code corresponds to the virtual artifact or the real artifact, and wherein the classifier is further configured to identify the bytecode transformation.

18. The system of claim 10, wherein the instructions are further executable to cause the processor to:
 store the fourth bytecode in the local repository in association with the virtual artifact.

19. A non-transitory, computer-readable medium storing instructions which, when executed by a processor, cause the processor to perform operations including:
 receiving a build request to convert source code for an application into application bytecode, wherein the application bytecode includes a first bytecode for the application;
 identifying a virtual artifact within the source code;
 requesting second bytecode associated with the virtual artifact from a local repository;
 in response to determining that the local repository does not store the second bytecode associated with the virtual artifact, retrieving, from a centralized repository, third bytecode associated with a real artifact that corresponds to the virtual artifact;
 applying a bytecode transformation to the third bytecode associated with the real artifact, wherein the bytecode transformation involves replacing at least a portion of the third bytecode to thereby generate a fourth bytecode, wherein the fourth bytecode is configured for use with a different operating system or a different runtime environment than the third bytecode; and
 adding the fourth bytecode to the application bytecode.

\* \* \* \* \*